July 9, 1940. T. BROWN 2,207,283
SUPPORTING RUNNER
Filed July 19, 1937
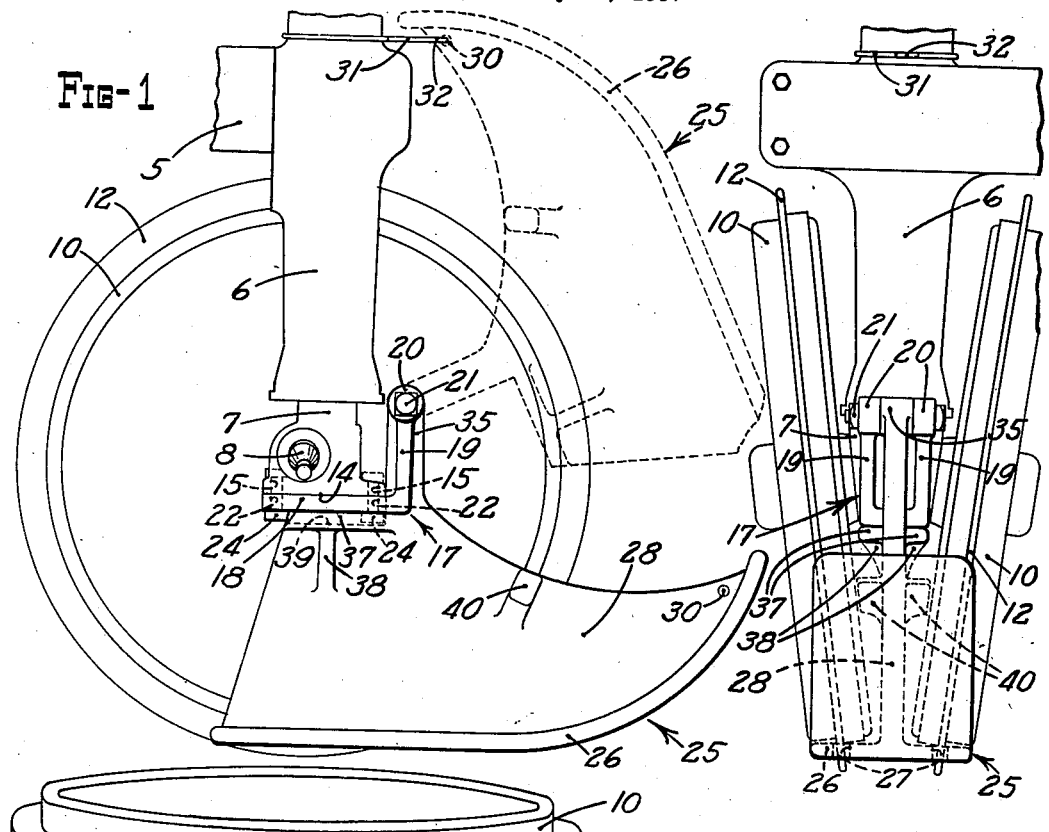
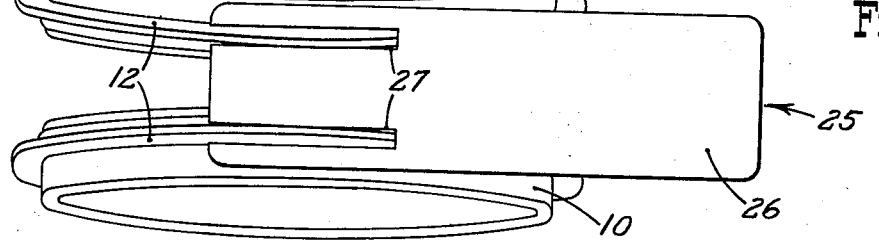
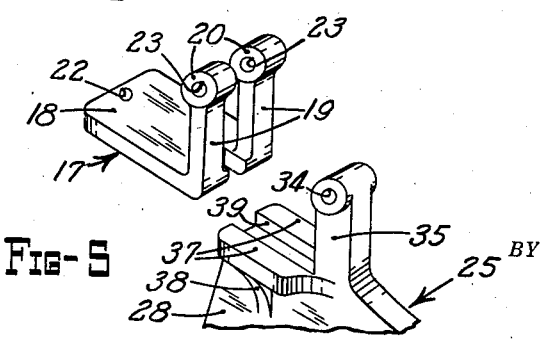
INVENTOR
THEOPHILUS BROWN
BY
ATTORNEYS Patented July 9, 1940

2,207,283

UNITED STATES PATENT OFFICE 2,207,283

SUPPORTING RUNNER

Theophilus Brown, Moline, Ill., assignor to Deere & Company, Moline, Ill., a corporation of Illinois Application July 19, 1937, Serial No. 154,391

21 Claims. (Cl. 280—9)

The present invention relates to ground engaging runners of the type adapted to be used on vehicles as auxiliary equipment where wheels are normally used, providing a large bearing surface which supports the weight of the vehicle and prevents it from sinking into soft ground. More particularly, the present invention relates to a mud shoe applicable for use with the relatively narrow rimmed dirigible wheels of agricultural tractors which are continually called upon to travel over soft, sticky soil.

One of the difficulties experienced with tractors having conventional dirigible wheels is in steering over wet, yielding ground. The relatively narrow rims of the dirigible wheels bearing the weight of the front end of the tractor tend to sink in, and instead of traveling in the direction turned, the mired down wheels continue to push their way straight ahead through the muck, making for erratic steering. In cases where the tractor includes closely spaced slanting dirigible wheels, it has been found that when operating under muddy conditions, mud and soil frequently collect between the wheels in a mass and that a forward rotation of the wheels tends to cause the mass of soil to wedge against the wheels at the lower portions, sometimes so tightly that rotation of the wheels is prevented. Considerable power is also wasted in overcoming the resistance of deeply buried wheels, reducing the power available for draft and for machinery operation.

The chief object of the present invention therefore, is to provide an auxiliary supporting runner for wheels of the class described, to prevent them from sinking into soft soil or snow. This is accomplished by the novel construction of the runner and mounting bracket in which my invention has been embodied whereby the runner may be mounted on a wheel supported vehicle and optionally moved into operative position providing the necessary additional bearing surface for supporting the weight of the vehicle, or swung up to inoperative position and carried there. As it quite frequently happens that only a small part of a tract of land presents difficult surface conditions, it is not necessary to use the large bearing surface of the runner at all times, and it becomes advantageous to return to the use of the wheels alone on harder ground.

Another object is to provide a device embodying my invention, constructed of comparatively simple and durable parts which may be easily manufactured at low cost, and which are readily replaceable when worn, or in the event that breakage should occur.

These and other objects and advantages of my invention will be apparent after a consideration of the following detailed description of a specific embodiment of my invention, in which reference is made to the drawing appended hereto, in which Figure 1 is a side elevation of a tractor dirigible wheel support structure embodying my invention, showing in solid lines, the runner in operative position, and in dotted lines, the runner in inoperative position. One wheel has been removed to more clearly show the parts;

Figure 2 is a front elevation of the device shown in Figure 1;

Figure 3 is a bottom view of the flanged wheels and runner, showing the slots which receive the flanges and permit them to engage the earth, acting as rudders to facilitate steering;

Figure 4 is a perspective detail view of the mounting bracket; and

Figure 5 is a perspective detail view of the runner support arm which cooperates with the mounting bracket shown in Figure 4.

The embodiment of my invention illustrated shows it as applied to the dirigible wheels of a tractor of the tricycle type having a single front support member on which are journaled two wheels on slightly inclined axes. This type of wheel mounting results in a very narrow tread permitting running between two rows of plants and is in common use at the present time.

In Figure 1 the frame of the tractor is represented by a longitudinally extending frame member 5, which terminates in a vertically disposed sleeve 6, within which is journaled the steering spindle 7. Extending laterally and downwardly from opposite sides of the base of the steering spindle 7 are two axles, one of which is indicated by the numeral 8 in Figure 1, and journaled on these axles are the two wheels 10. Raised on the outer periphery of the rims of the wheels 10 are flanges 12, the purpose of which is to act as guides for the wheels.

The base of the steering spindle 7 includes a plane bottom surface 14, substantially parallel to the ground, with two bolt holes 15 spaced longitudinally and extending through the base perpendicular to the surface 14.

Fixed to the base of the steering spindle 7 is an L-shaped mounting bracket 17, shown in detail in Figure 4, comprising a horizontal base 18 adapted to cooperate with the surface 14 of the steering spindle base, and two upturned laterally spaced arms 19 terminating in lugs 20 which have aligned holes 23 which are adapted to receive a pivot bolt 21. In the base 18 of this bracket are two apertures 22, spaced longitudinally for alignment with the holes 15 when the bracket 17 is positioned against the surface 14 of the base of the steering spindle 7. The bolts 24 passing through the aligned apertures 15, 22 maintain the bracket 17 in rigid relation with the steering spindle.

Coming now to the runner, indicated generally by the numeral 25, it is seen to comprise a broad, flat shoe 26 extending longitudinally forward from a point behind the center and below the rims of the wheels 10 to a point well ahead of the wheels. At its forward end, the shoe is curved upwardly to form a sliding runner adapted to ride over ground irregularities, while the rear end of the shoe is slotted with two laterally spaced, longitudinally extending slots 27 through which the flanges 12 of the wheels extend to engage the soil, acting as rudders to guide the runner. A supporting web 28, perpendicular to the shoe and parallel to its longitudinal axis, provides the means for connecting the runner with the mounting bracket 17, and at the same time gives longitudinal rigidity to the shoe 26.

As previously stated, it is not desirable to keep the runner in operative position at all times. Where the ground is sufficiently hard to support the wheels alone, it is advantageous to disconnect the runner and use the wheels because of the lesser frictional resistance and improved steering qualities of the latter. The runner 25 is pivotally connected to the mounting bracket 17, therefore, so that it can be swung upwardly out of the way and held in inoperative position by a latch 31 comprising a wire loosely embracing the sleeve 6 and adapted to slide relative thereto, and having a hook portion 32, which engages a perforation 30 in the web 28. The runner is shown in inoperative position in the broken line representation in Figure 1, and as will be seen from this figure, the hook portion 32 is disposed closely adjacent to the steering axis of the spindle 7 so that the latch 31 effectively holds the runner 25 up in its inoperative position while accommodating normal steering movement of the spindle and parts attached thereto.

The pivotal connection between the runner 25 and the bracket 17 is secured by means of a pivot bolt 21 which is passed through the aligned holes 23 in the bracket lugs 20, and a transverse hole 34 in a vertical lug extension 35 on the upper portion of the web of the runner member 25. The lug extension 35 on the runner member is shown in detail in Figure 5, and is inserted between and aligned with the two bracket lugs 20.

The portion of the web 28 adjacent to the bottom surface of the mounting bracket 17 is provided with shoulders 37 which bear against the mounting bracket, limiting the swinging movement of the runner 25 to the rear and maintaining the runner in operative position against the thrust forces set up by resistance of the ground to the passage of the runner. These shoulders also resist torsional stresses tending to rotate the runner in a vertical lateral plane about its point of connection with the mounting bracket 17. Each of the shoulders 37 is reinforced by a vertical rib 38. A slot 39 in the bearing surface of the shoulders 37 affords clearance for the heads of the bolts 24 connecting the mounting bracket to the steering spindle.

At a point adjacent to the rims of the wheels 10 and forward of the pivotal connection with the mounting bracket 17, two lugs 40 raised on opposite sides of the web 28 are adapted to bear on the sides of the wheel rims and serve to limit any lateral displacement of the runner 25 to the amount of the clearance of the lugs with the wheel rims. Thus, if the runner should strike an obstruction obliquely, the slack in the pivotal connection permits deflection of the runner to the point where one of the lugs 40 contacts the adjacent wheel rim, and the lateral force is transmitted through the wheel instead of through the pivot bolt 21.

Working with normal surface conditions the runner is carried in inoperative position by means of the latch 31 engaging the perforation 30, and the wheels 10 bear directly on the ground. When a stretch of soft soil or snow is encountered, however, the latch 31 can be released by the operator and the runner permitted to swing down. Driving the tractor ahead carries the runner under the wheels and into operative position, after which the large bearing surface of the shoe 26 permits the runner to slide over the soft soil without sinking, while the wheel flanges 12 extending through the slots 27 engage the soil and act as rudders to hold the runner on the course steered. When the runner is no longer needed the tractor is backed up slightly, carrying the runner out from under the wheels, and it can then be locked back up in inoperative position.

What I claim is:

1. In combination with a frame, a dirigible wheel journaled on said frame, a ground engageable runner connected to said frame for movement relative thereto between operative and inoperative positions, said runner cooperating with said wheel to support the weight of said frame thereon in operative position and carried out of contact with the ground in inoperative position, and flange means on said wheel extending below said runner and engaging the earth to guide the runner.

2. In combination with a supporting frame, a dirigible flanged wheel journaled on said supporting frame, a ground engaging runner cooperative with said wheel, and means for mounting said runner on said frame for relative movement thereto between an operative position in which said runner supports the weight of said frame and an inoperative position in which the runner is carried out of contact with the ground, said runner having a slot adapted to receive the wheel flange and through which the latter extends when the runner is in operative position to provide a guide flange.

3. In combination with a frame, a dirigible flanged wheel journaled thereon, a ground engaging runner cooperative with said wheel and pivotally connected to said frame for vertical swinging movement relative to said frame between a lowered operative position in which the weight of said frame is supported on the runner, and a raised inoperative position in which the runner is carried for transport, said runner having a slot adapted to receive the wheel flange and through which the latter extends when the runner is in operative position to provide a guide flange means for limiting the swinging downward movement of said runner to hold the latter in operative position, means for securing said runner in inoperative position, and means for bracing said runner against lateral thrust.

4. In combination with a tractor having a frame supported at the forward end by at least one dirigible wheel, a ground engaging runner pivotally mounted on said frame for vertical swinging movement relative thereto between operative and inoperative positions, said runner cooperating with said dirigible wheel in operative position to support the weight of the forward end of said tractor frame, means for securing said runner out of contact with the ground in inoperative position, and means for bracing said runner against lateral thrust, said bracing means comprising a pair of laterally spaced shoulders bearing against said frame.

5. In combination with a tractor having a frame supported at the forward end by a pair of laterally spaced dirigible wheels, a ground engaging runner cooperative with said dirigible wheels and mounted on said frame for swinging movement between operative position in which the weight of said tractor frame is supported on said runner, and inoperative position in which the runner is carried out of contact with the ground, means for securing said runner in inoperative position, means for bracing said runner against lateral thrust, and a pair of lugs extending from opposite sides of said runner, said lugs being adapted to bear against the rims of said dirigible wheels and transmit lateral torsional forces from the runner to said frame through said wheels.

6. In combination with a tractor having a frame including a vertically disposed sleeve disposed at the forward end thereof, a steering spindle rotatably disposed within said sleeve, a pair of laterally spaced wheels journaled on opposite sides of said steering spindle and adapted to turn horizontally as the spindle is rotated to steer the tractor, a mud shoe including a runner having an operative position under said tractor wheels for supporting said tractor in soft ground and a supporting web fixed to said runner and disposed between said wheels, means on said web engaging said spindle for supporting the latter in operative position, and means for pivotally connecting said web to said spindle providing for vertical swinging movement of said shoe into and out of said operative position.

7. In combination with a tractor having a frame including a vertically disposed sleeve disposed at the forward end thereof, a steering spindle rotatably disposed within said sleeve, a pair of laterally spaced wheels journaled on opposite sides of said steering spindle and adapted to turn horizontally as the spindle is rotated to steer the tractor, a mud shoe including a runner having an operative position under said tractor wheels for supporting said tractor in soft ground and a supporting web fixed to said runner and disposed between said wheels, a bracket fixed to the lower end of said spindle and having a portion defining a bearing surface adapted to seat upon said supporting web when said shoe is in said operative position, and means pivotally connecting said web with said bracket for swinging said shoe between said operative position and an inoperative position away from the ground.

8. In combination with a tractor having a frame including a vertically disposed sleeve disposed at the forward end thereof, a steering spindle rotatably disposed within said sleeve, a pair of laterally spaced wheels journaled on opposite sides of said steering spindle and adapted to turn horizontally as the spindle is rotated to steer the tractor, a mud shoe including a runner having an operative position under said tractor wheels for supporting said tractor in soft ground and a supporting web fixed to said runner and disposed between said wheels, a bracket fixed to the lower end of said spindle and having a raised portion extending in front of said spindle, means for pivotally connecting said shoe to said raised portion, providing for swinging said shoe forwardly and upwardly from said operative position to an inoperative position in front of said vertical sleeve, and means engaging said sleeve for retaining said shoe in the latter position.

9. In combination with a tractor having a frame including a vertically disposed sleeve disposed at the forward end thereof, a steering spindle rotatably disposed within said sleeve, a pair of laterally spaced wheels journaled on opposite sides of said steering spindle and adapted to turn horizontally as the spindle is rotated to steer the tractor, a mud shoe including a runner having an operative position under said tractor wheels for supporting said tractor in soft ground and a supporting web fixed to said runner and disposed between said wheels, a bracket fixed to the lower end of said spindle and having a portion defining a bearing surface adapted to seat upon said supporting web when said shoe is in said operative position, means for pivotally connecting said web with said bracket for swinging said shoe between said operative position and an inoperative position away from the ground, and bracing means comprising a pair of lugs raised on opposite sides of said supporting web and adapted to bear against the rims of said wheels to transmit lateral torsional stresses from said shoe to said wheels.

10. The combination with a tractor having a frame, a substantially vertically disposed steering spindle journaled on said frame, and a pair of closely spaced ground wheels journaled on the lower end of said steering spindle for supporting said frame, of a runner attachment comprising a mounting member adapted to be fixed to said steering spindle adjacent both said wheels, and a ground engaging runner connected to said mounting member for movement relative thereto between said wheels and having portions at the rear end to receive both of said wheels.

11. The combination set forth in claim 10, further characterized by said mounting member being fixed to the lower end of said steering spindle substantially in the steering axis thereof.

12. The combination of a frame, a substantially vertical steering post journaled in said frame, a ground wheel rotatably supported on said steering post, and a mud shoe comprising a runner portion and a supporting portion fixed thereto, means for pivotally connecting said supporting portion to said steering post ahead of the axis of said ground wheel for vertical swinging, said mud shoe being carried in a raised position ahead of said steering post when inoperative and being swung downwardly and rearwardly therefrom into ground engaging position when operative, said supporting portion being provided with a pair of laterally spaced shoulders extending rearwardly relative to said connecting means and adapted to bear against said steering post when in operative position to prevent further rearward swinging of said mud shoe.

13. The combination of a frame, a substantially vertical steering post journaled in said frame, a flanged ground wheel rotatably supported on said steering post, a bracket member adapted to be fixed to said steering post, and a mud shoe comprising a runner portion and a supporting portion being pivotally connected to said bracket member ahead of the axis of said wheel for vertical swinging between an inoperative raised position ahead of said steering post and an operative position below and rearward of said pivotal connection, said runner portion being provided with a rearwardly opening slot adapted to receive the flange of said wheel when lowered to operative position so that said flange serves to prevent side slippage of the runner.

14. In combination with a tractor having a frame, a substantially vertical sleeve fixed thereto, a steering post journaled in said sleeve and having a pair of axles extending laterally from opposite sides thereof, flanged wheels journaled on each of said axles, a mud shoe including a runner and a supporting web fixed thereto and disposed between said wheels, a bracket member fixed to said spindle and extending forwardly therefrom, means for pivotally connecting said supporting web to said bracket member ahead of said axles for vertical swinging between an inoperative raised position ahead of said steering post and an operative position below and rearward of said connecting means, said runner being provided with two parallel, rearwardly opening slots adapted to receive the flanges of both of said wheels when lowered to operative position so that said wheel flanges serve also as runner flanges.

15. The combination of a wheel support member, a flanged wheel journaled on said member, and a runner pivotally connected to said support member for swinging movement relative thereto between a raised inoperative position out of contact with the ground and a lowered operative position in contact with the ground adjacent said wheel, the flange of said wheel extending below said runner when the latter is in operative position to prevent side slippage.

16. The combination of a wheel support member, a wheel journaled on said member, a mud shoe comprising a runner and supporting web means fixed thereto, means for pivotally connecting said web means to said wheel support member for vertical swinging between a raised inoperative position ahead of said member and a lowered operative position with the runner disposed beneath said wheel, and a pair of lugs provided on said web means and adapted to bear against the rim of said wheel when said mud shoe is displaced laterally.

17. The combination with a tractor having a frame, a substantially vertically disposed steering spindle journaled on said frame for steering movement about a generally vertical axis, and a ground wheel journaled on said steering spindle for supporting said frame, of a ground engaging runner pivotally connected to said spindle for swinging about a transverse axis between operative and transport positions, said runner swinging generally laterally with said ground wheel during steering movement of the latter and in both operative and transport positions, said runner being adapted in operative position to support the weight of the frame and associated parts, and means disposed on said frame adjacent said vertical steering axis for rockably receiving said runner to hold the latter in transport position while accommodating movement thereof with said spindle relative to said frame.

18. The combination with a tractor having a generally vertically disposed pedestal and a generally vertically disposed steering spindle received for rocking movement within said pedestal, the lower end of said spindle projecting downwardly below the lower end of said pedestal, of a ground engaging runner pivotally connected to the lower projecting end of said spindle and swingable generally vertically into and out of ground engaging position, a pair of ground wheels journaled for rotation on the lower end of said spindle at opposite sides of said runner, and means carried at the upper end of said pedestal for releasably holding said runner in transport position.

19. The combination with a tractor having a generally vertically disposed pedestal, a steering spindle mounted for movement therein about a generally vertical axis and extending downwardly below the lower end of said pedestal, a pair of ground wheels journaled for rotation on the lower end of said spindle in planes which diverge upwardly, the lower peripheral portions of said ground wheels operating in substantially contiguous relation, of a ground engaging runner pivotally connected with the lower end of said spindle and adapted in one position to be swung downwardly under said wheels, said runner having sufficient width to receive the lower portions of both of said wheels.

20. The combination with a tractor having a pedestal, a vertical spindle therein, and a pair of closely spaced slanting front wheels journaled for rotation at the lower end of said spindle, of a ground engaging runner pivoted to said spindle and adapted to be disposed in operating position below and in front of the lower portions of both of said wheels.

21. The combination with a tractor having a pedestal, a vertical spindle therein, and a pair of closely spaced slanting front wheels journaled for rotation at the lower end of said spindle, of a ground engaging runner, means pivotally connecting the latter adjacent its rear end to the lower end of said spindle, said runner being swingable from an inoperative position to an operative position between said wheels, the rear end of said runner being disposed approximately below the axis of said pivotal connection whereby when the runner is swung downwardly and the rear end engages the ground, driving the tractor forwardly will carry the runner into its operative position, and backing the tractor will move said runner toward its inoperative position.

THEOPHILUS BROWN.